United States Patent
Cucinotta

(10) Patent No.: US 10,410,004 B2
(45) Date of Patent: Sep. 10, 2019

(54) METHOD OF PREVENTING ACCESS TO SENSITIVE DATA OF A COMPUTING DEVICE

(71) Applicant: Alcatel Lucent, Boulogne Billancourt (FR)

(72) Inventor: Tommaso Cucinotta, Dublin (IE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/779,378

(22) PCT Filed: Mar. 5, 2014

(86) PCT No.: PCT/EP2014/000572
§ 371 (c)(1),
(2) Date: Sep. 23, 2015

(87) PCT Pub. No.: WO2014/154323
PCT Pub. Date: Oct. 2, 2014

(65) Prior Publication Data
US 2016/0048695 A1     Feb. 18, 2016

(30) Foreign Application Priority Data

Mar. 28, 2013 (EP) .................................. 13305396

(51) Int. Cl.
*G06F 21/62* (2013.01)
*G06F 21/51* (2013.01)
(Continued)

(52) U.S. Cl.
CPC .............. *G06F 21/62* (2013.01); *G06F 21/51* (2013.01); *G06F 21/57* (2013.01); *G06F 21/60* (2013.01); *G06F 2221/2141* (2013.01)

(58) Field of Classification Search
CPC ....... G06F 21/62; G06F 21/6281; H04L 63/10
See application file for complete search history.

(56) References Cited

U.S. PATENT DOCUMENTS 8,180,893 B1 * 5/2012 Spertus .................. G06F 21/52
709/200
8,806,655 B1 * 8/2014 Brownell ............... H04L 63/10
726/27

(Continued)

FOREIGN PATENT DOCUMENTS

CN    101808305     8/2010
CN    102214288     10/2011
(Continued)

OTHER PUBLICATIONS

Official Journal EPO; Notice from the European Patent Office dated Oct. 1, 2007 Concerning Business Methods; Official Journal of the European Patent Office; Munchen, DE; vol. 30, No. 11; dated Nov. 1, 2007; pp. 592-593; XP007905525; ISSN: 0170-9291.

*Primary Examiner* — David J Pearson
(74) *Attorney, Agent, or Firm* — McCracken & Gillen LLC

(57) ABSTRACT

A technique is provided for controlling access by an application to data or a service supported by a computing system, a computer program product and an access control unit. The technique includes identifying a request from an application for access to data or a service supported by the system, determining whether access has been restricted to the data or service, and, if so, indicating to the application that the request for access has been granted by the system and emulating the data or service when the data or service is accessed by the application.

15 Claims, 1 Drawing Sheet

(51) Int. Cl.
*G06F 21/57* (2013.01)
*G06F 21/60* (2013.01)

(56) References Cited

U.S. PATENT DOCUMENTS

| | | |
|---|---|---|
| 2002/0188649 A1 | 12/2002 | Karim |
| 2003/0131152 A1 | 7/2003 | Erlingsson |
| 2004/0176104 A1 | 9/2004 | Arcens |
| 2008/0022133 A1* | 1/2008 | Sobel .................. G06F 21/6218 713/193 |
| 2008/0104195 A1 | 5/2008 | Hawkins et al. |
| 2011/0151924 A1 | 6/2011 | Miller |
| 2011/0286343 A1* | 11/2011 | Powell .................. H04W 76/02 370/252 |
| 2012/0084835 A1* | 4/2012 | Thomas ............ G06F 17/30867 726/3 |
| 2012/0151211 A1* | 6/2012 | Kreiner ................ H04L 63/102 713/168 |
| 2012/0255021 A1* | 10/2012 | Sallam .................. G06F 21/566 726/25 |
| 2012/0291102 A1* | 11/2012 | Cohen .................... G06F 21/57 726/4 |
| 2013/0152154 A1* | 6/2013 | Xiao ....................... G06F 21/00 726/1 |
| 2013/0179991 A1* | 7/2013 | White .................... G06F 21/53 726/29 |
| 2013/0286224 A1* | 10/2013 | Stedman ............. H04L 63/0281 348/207.1 |
| 2014/0007184 A1* | 1/2014 | Porras .................... G06F 21/53 726/1 |
| 2014/0283132 A1* | 9/2014 | Kenna .................... G06F 21/62 726/29 |

FOREIGN PATENT DOCUMENTS

| | | |
|---|---|---|
| EP | 2533157 | 12/2012 |
| WO | 01/88673 | 11/2001 |
| WO | WO 2014019364 A1 * | 2/2014 ............ H04W 12/02 |

* cited by examiner

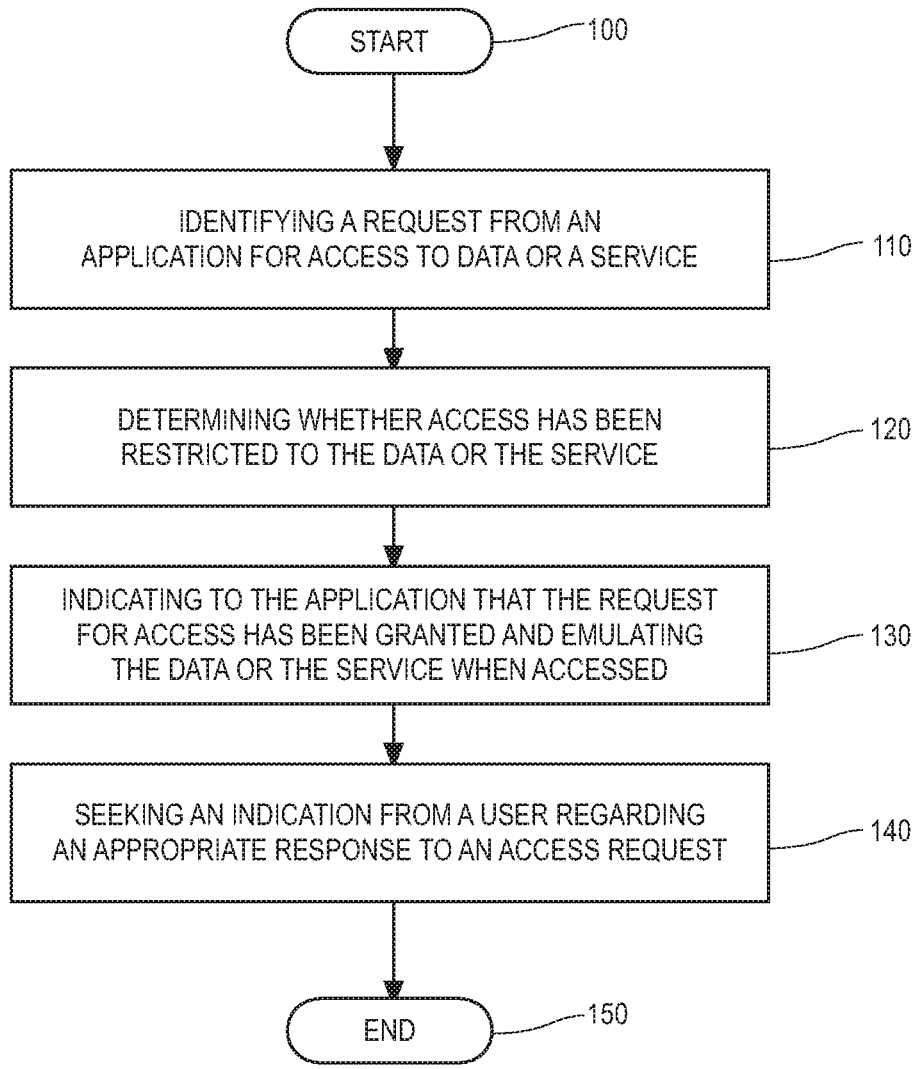

METHOD OF PREVENTING ACCESS TO SENSITIVE DATA OF A COMPUTING DEVICE

FIELD OF THE INVENTION

The present invention relates to a method of controlling access by a software application to data or a service supported by a computing system, a computer program product and access control unit configured to perform that method.

BACKGROUND

The structure of computing systems may be such that a substantially flat and permissive architecture is implemented. In such a system, programs, software applications, services and other similar runnables are all able to access most other components of the system. Computing systems may also be structured such programs, software applications, services and other runnables exist in discrete spaces and relationships between such system components are explicitly managed. The latter architecture may be of particular use in mobile computing scenarios and distributed computing technologies, including cloud computing. In such mobile and cloud computing scenarios, applications and similar may be distributed such that software components of an application are spread across one or more cloud data centers, whilst little more than an application user-interface actually runs on a local device. For example, a network connectable device, such as a smart phone or a tablet. Furthermore, applications and other similar runnables may be operable such that they access and process both data that is available locally to a personal computing device, and data fetched from one or more remote sources. Some applications and other similar runnables may operate such that their managed data is stored remotely which may pose challenges in relation to user privacy.

Different operating systems (OSs) and run-time environments exist for development and deployment of cloud applications. Such operating systems and run time environments for mobile devices include, for example, Android, Blackberry, iOS and similar. Each may include a different set of features which can help to mitigate security and privacy risks associated with the discrete application architecture described above and may give a user some form of control on the privacy of data managed by applications installed on a device.

Nonetheless, such features may pose problems. It is desired to offer an alternative means to offer a user control over applications installed on a device.

SUMMARY

Accordingly, a first aspect provides a method of controlling access by an application to data or a service supported by a computing system, the method comprising: identifying a request from the application for access to data or a service supported by the system; determining whether access has been restricted to the data or service; and, if so, indicating to the application that the request for access has been granted by the system and emulating the data or service when the data or service is accessed by the application.

The first aspect recognizes that some computer system operating environments allow a user to specify a set of permissions in respect of each application. In some cases, certain permissions may need to be granted, in order for an application or other runnable to perform its function. For example, on a mobile phone, it may be typical for an application to request permissions such as: access to a local phone address book, an ability to perform calls, to send SMS messages, to access GPS location information, a calendar, a request to access a local or remote file-system (for example, picture, audio, and/or video contents), access to a local camera and/or microphone available on the device or other similar functionality.

Irrespective of a specific operating system, an application will typically be operable to declare or make a request in relation to which permission(s) it needs to be granted by other services or files on a device in order to function properly. A system user can be given an opportunity to grant such permissions or deny them when installing such an application. It will be appreciated, for example, that on Android devices, a set of permissions is specified in a so called "manifest" XML file which is shipped along with the ".apk" application installation package, according to which a user can decide to grant all of the required permissions and install the application, or deny all requested permissions and not install the application. Such an implementation may be limiting. Various alternative implementations are possible. For example, Blackberry devices are such that a more finely-grained permissions model is implemented. In such an implementation, a user may selectively grant or deny individual permissions as requested by an application and such settings can be dynamically changed.

Developers and providers of applications for mobile devices and other computing systems often have interest in designing applications which access more data and services than strictly necessary to function on a personal device. For example, a free application which purports to be primarily for easing browsing of a remote website, for example, a social network, on-line cooking recipes, an on-line dictionary, or transport information such as flights, trains or similar, may operate such that it also tries to harvest private sensitive information available on a personal device. That sensitive information may, for example, comprise phone or address book information, pictures, e-mail or other similar device content. The application may operate to report a portion of such sensitive information to the website that is being browsed for free through the application. In such scenarios, a user may be substantially unaware that sensitive information is being used, since some interaction between the application and the remote website is part of the normal activity of the application. Furthermore, if sharing of the sensitive information is encrypted, a user may hardly notice anything even if a network traffic analyzer is installed and run. If, however, an application requires a specific permission that appears to be outside of the scope of the functionality of an application or similar runnable, for example, permission is requested to access an address book by an application which purports to be for browsing remote recipes, a user may become suspicious and decide to not install the application. On more advanced operating systems, a user may try to install the application anyway, but deny any individual permissions which appear to a user to be unnecessary to the primary function of an application.

However, application providers and developers may create an application which is operable to detect such a situation, either by means of a proper API made available to applications by a run-time environment, which can allow an application to query an OS regarding whether a permission has been granted or not, or by trying to perform an action requiring particular permissions, for example, accessing the phone book, GPS information, or local media files, and detecting a resultant error raised in a run-time environment due to the unauthorized access resulting from the denied permission.

In such cases, application developers and providers may try to force users into installing an application and dropping preferred privacy requirements by ensuring an application refuses to perform its main functionality unless the requested permission is granted. As a consequence, many users may feel forced into dropping their preferred permission restrictions and privacy requirements and let an installed application manage or transmit more personal or private data than they deem necessary.

In some cases, users can only avoid leaking private information by not installing such "privacy-invading" applications.

The first aspect recognizes that it is possible to provide an extended access-control model for systems including mobile and cloud applications, in which individual permissions can be "seemingly granted" in addition to being directly granted or denied. As a result, an OS or run-time environment may be operable to let users specify that the OS should behave as if permissions requested by an application have been granted, but operate such that data or a service available normally as a result of those permissions remains inaccessible to the requesting application.

The first aspect may be of use when a software application requests access to data or a service provided on a computing system. That system may comprise a mobile device. The computing system may, however, comprise a PC, tablet, virtual machine or any similar discrete computing unit within a computing system.

The first aspect may be performed on an application by application basis and, of course, may be configured in relation to a permission or access request for each data or service being requested by an application on a data or service basis. That is to say, it may be possible to fully allow some permissions being requested, fully deny some permissions being requested, and/or "seemingly grant" some permissions being requested as appropriate. The permissions or restrictions set may be applied across all requesting applications in respect of data or a service or may be requesting-application specific.

In one embodiment, emulating comprises: determining which data or service is being accessed by the application and creating a response to the application in dependence upon the data or service being accessed. Since aspects and embodiments operate such that the application is not able to distinguish a "seemingly granted" permission from a regularly granted one, the application will expect some data or a service to be available. That data or service can be emulated by steps taken by an OS itself or a dedicated software component.

In one embodiment, emulating comprises: determining which data or service is being accessed by the application and seeking an indication of a suitable response from a user before creating a response to the application in dependence upon the data or service being accessed together with the indicated suitable response.

In one embodiment, creating a response comprises: assessing whether a user has indicated that at least one response associated with data or a service being accessed is to remain accessible to the application and, if so, creating a response based on the accessible response.

In one embodiment, if the service being accessed is: a microphone, camera, video camera, GPS location service, contact list, or a local file system, the created response comprises: an audio file, image, movie, location data, contact details, or appropriate folder structure respectively. Emulation may, for example, take many forms. For example, permission to access a mobile phone address book may require that in the event that such permission is seemingly granted, an OS lets an application believe that the permission has been granted by a user, yet ensure that all access attempts made by the application are actually rerouted to access an empty or fake address book under control of a user. In an alternative embodiment, a user might have an interface to decide which real address book entries are actually exposed to an application which has been "seemingly granted" access to the entire address book.

In one embodiment, if the service being accessed is cellular internet access, the created response comprises determining whether a WiFi network is accessible and routing a request for internet access via the WiFi network. Permission to access the Internet either through an operator data service or wifi may be emulated in some embodiments. Normally, mobile devices may be operable to distinguish between Internet access provided through wifi or through data services available by using a cellular network. The latter is often a payment service, whilst the former may often be available for free, due to the wide availability of free (or flat rate) wifi services. Applications provided by mobile operators may try to request Internet access though the mobile network and ignore the availability of a wifi connection. In such a case, an "Internet through mobile data services" permission may be associated with a special emulation mode by which the traffic is re-routed through a wifi network, if available.

In one embodiment, if the service being accessed is internet access, the created response comprises return of a cached webpage or return of an appropriate error webpage. In some embodiments, it is possible to associate a "seemingly granted" mode of permission to access the Internet with a special Internet service that, for example, is operable to answer common Internet service requests with fake answers. For example, HTTP requests may be answered to by providing back fake HTML empty pages, or by returning data from the cache of the web browser normally functioning on the device. Similarly, requests for DNS translations may be emulated by returning fake IP answers, or real answers as cached from a local DNS cache. For example, a map application may be trying to fetch location-specific data from a remote website. Should the user be willing to "seemingly grant" Internet access to such application, then specific URLs directed towards a third-party server, normally carrying the user's location data, might be answered with empty or unambiguously fake images that a user could easily distinguish on the map application, whilst the application remains unaware of the seemingly granted permission. Complex scenarios for emulated Internet access may be impossible to emulate, notably those ones involving encrypted data exchanges with a remote server, so in some embodiments, emulation techniques may be employed which are based on error messages notifying an application of temporary Internet problems, or similar.

In one embodiment, the method comprises: seeking an indication from a user regarding an appropriate response to an access request before emulating a response. In some implementations involving emulation of specific "seemingly granted" features, the precise behavior of an emulated functionality might involve or require direct interaction with a user. Such an approach may be helpful in scenarios in which a user is likely to be in a position to know what might be the most appropriate type of emulated answer to provide to an application in a specific instance to let it perform a desired action.

In one embodiment, determining comprises: seeking an indication of whether a user wishes to restrict access to the data or service. Accordingly, a user may be specifically asked on a service by service, data by data and/or application by application basis whether to grant, deny or seemingly grant requested permissions. Such an approach may allow for maximum flexibility and greatest user choice.

In one embodiment, determining comprises: assessing whether a default restriction of access to the data or service has been set. Accordingly, a service or user may set permissions to default to seemingly granted, thus ensuring privacy or security of such data or a service. Accordingly, enterprise data may be set as a default to have restricted permissions, irrespective of choices made by a user.

A second aspect provides a computer program product operable, when executed on a computer, to perform the method of the first aspect. Such a computer program product may comprise an operating system including such functionality.

A third aspect provides an access control unit configured to control access by an application to data or a service supported by a system, the access control unit comprising: request identification logic operable to identify a request from the application for access to the data or service supported by the system; determination logic operable to determine whether access has been restricted to the data or service; and, if so, implementation logic operable to indicate to the application that the request for access has been granted by the system and instruct emulation logic to emulate the data or service when accessed by the application.

In one embodiment, the emulation logic is operable to determine which data or service is being accessed by the application and create a response to the application in dependence upon the data or service being accessed.

In one embodiment, the emulation logic is configured to determine which data or service is being accessed by the application and seek an indication of a suitable response from a user before creating a response to the application in dependence upon the data or service being accessed together with the indicated suitable response.

In one embodiment, said emulation logic is operable to create a response by assessing whether a user has indicated that at least one response associated with data or a service being accessed is to remain accessible to the application and, if so, to create a response based on the accessible response.

In one embodiment, if the service being accessed is: a microphone, camera, video camera, GPS location service, contact list, or a local file system, the emulation logic is operable to create a response comprising: an audio file, image, movie, location data, contact details, or appropriate folder structure respectively.

In one embodiment, if the service being accessed is cellular internet access, the emulation logic is configured to create a response by determining whether a WiFi network is accessible and, if so, to route a request for internet access via the available WiFi network.

In one embodiment, if the service being accessed is internet access, the emulation logic is operable to return of a cached webpage or return an appropriate error webpage.

In one embodiment, the control unit comprises: query logic operable to seek an indication from a user regarding an appropriate response to an access request before emulation of a response by the emulation logic.

In one embodiment, the determination logic is configured to: seek an indication of whether a user wishes to restrict access to the data or service.

In one embodiment, the determination logic is configured to: assess whether a default restriction of access to the data or service has been set.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

DESCRIPTION OF THE DRAWINGS

FIG. 1 shows an illustrative flow chart for an exemplary method of operating an embodiment of the invention arranged in accordance with the principles of the invention.

DESCRIPTION OF EMBODIMENTS

Overview

Embodiments of the present invention will now be described further. Before discussing the embodiments in any more detail, first an overview will be provided.

Aspects and embodiments provide an extended access-control model for systems including mobile and cloud applications, in which individual permissions can be "seemingly granted" in addition to being directly granted or denied. As a result, an OS or run-time environment may be operable to let users specify that the OS should behave as if permissions requested by an application have been granted, but operate such that data or a service available normally as a result of those permissions remains inaccessible to the requesting application. Since aspects and embodiments operate such that the application is not able to distinguish a "seemingly granted" permission from a regularly granted one, the application will expect some data or a service to be available. That data or service can be emulated by steps taken by the OS itself or a dedicated software component.

Emulation may, for example, take many forms. For example, permission to access a mobile phone address book may require that in the event that such permission is seemingly granted, an OS lets an application believe that the permission has been granted by a user, yet ensure that all access attempts made by the application are actually rerouted to access an empty or fake address book under control of a user. In an alternative embodiment, a user might have an interface to decide which real address book entries are actually exposed to an application which has been "seemingly granted" access to the entire address book.

Seemingly granted permissions are a feature of the OS and its associated middleware services for access-control; and are completely transparent to applications. According to aspects and embodiments, any attempt by an application to query the OS about whether a seemingly granted permission has actually been granted results in the OS indicating to an application that permission has been regularly granted.

Implementation of seemingly granted permissions may be achieved in various ways, as discussed in the following paragraphs in which various types of permissions are considered and individually discussed:

The case of seemingly granting permission to access information in a local phone address book has been discussed above.

The case of seemingly granting permission to access a camera or microphone may result in an OS which can take steps return fake video and/or appropriate visual or audio data to an application that has been seemingly granted such access.

For a permission to access GPS location, a fake GPS location service may be operable to return an arbitrary location, as desired by the device user/owner.

For permissions related to local file-system access (pictures and other media files such as audio and video files), it is similarly possible to implement a fake file-system service showing solely empty folders, and/or to implement a filter which shows an application contents which are a subset of the real file system actual contents, as specified by a user via an appropriate user interface.

Permission to perform calls or send SMS may be somewhat more difficult to emulate, but it may, according to come embodiments, be relatively easy to emulate a fake phone call with a non-responding number.

Permission to access the Internet either through an operator data service or wifi may be emulated in some embodiments. Normally, mobile devices may be operable to distinguish between Internet access provided through wifi or through data services available by using a cellular network. The latter is often a payment service, whilst the former may often be available for free, due to the wide availability of free (or flat rate) wifi services. Applications provided by mobile operators may try to request Internet access though the mobile network and ignore the availability of a wifi connection. In such a case, an "Internet through mobile data services" permission may be associated with a special emulation mode by which the traffic is re-routed through a wifi network, if available.

In some embodiments, it is possible to associate a "seemingly granted" mode of permission to access the Internet with a special Internet service that, for example, is operable to answer common Internet service requests with fake answers. For example, HTTP requests may be answered to by providing back fake HTML empty pages, or by returning data from the cache of the web browser normally functioning on the device. Similarly, requests for DNS translations may be emulated by returning fake IP answers, or real answers as cached from a local DNS cache. For example, a map application may be trying to fetch location-specific data from a remote website. Should the user be willing to "seemingly grant" Internet access to such application, then specific URLs directed towards a third-party server, normally carrying the user's location data, might be answered with empty or unambiguously fake images that a user could easily distinguish on the map application, whilst the application remains unaware of the seemingly granted permission.

Complex scenarios for emulated Internet access may be impossible to emulate, notably those ones involving encrypted data exchanges with a remote server, so in some embodiments, emulation techniques may be employed which are based on error messages notifying an application of temporary Internet problems, or similar.

In some embodiments and implementations of aspects described herein, a subset of all permissions available on an OS may be associated with a possibility of being configured as "seemingly granted" ones. In some implementations involving emulation of specific "seemingly granted" features, the precise behavior of an emulated functionality might involve or require direct interaction with a user. Such an approach may be helpful in scenarios in which a user is likely to be in a position to know what might be the most appropriate type of emulated answer to provide to an application in a specific instance to let it perform a desired action.

It will be appreciated that described aspects and embodiments may, for example, be implemented on the Android OS, a widely used open-source OS for mobile devices. For example, when trying to access a device file system, an Android application is typically operable to use the FileReader and/or the File classes, by providing a pathname of a file that is to be accessed. If the file path is correct but the permission to access the local file-system is not granted (e.g., READ_EXTERNAL_STORAGE), then the application would receive an Unauthorized Access Exception, typically in the form of a raised run-time exception, which can be detected by the application. However, if a seemingly granted permission had been implemented, the read operation would appear to succeed, although the OS would operate to present a requesting application with empty, or fake, file or folder contents.

Aspects and embodiments may be implemented such that a user-interface related to applications management and installation allows a user the possibility to specify which permission(s) are to be "seemingly granted" and which are to be regularly granted.

Aspects and embodiments described may allow a user of a computer system, for example, a mobile device, to install applications for mobile devices and cloud applications, but deny those applications permission to access data or services or other software components available on the device. A system may operate to let an application believe that requested access permissions have been granted. This enables a user to install one or more applications with restricted permissions even if an application developer or provider has designed an application such that a primary functionality is only available if all, or key, permissions relating to, for example, a secondary application function, have been granted. A mechanism in accordance with aspects and embodiments described may allow, for example, the preservation of user privacy in mobile and cloud computing environments.

FIG. 1 shows an illustrative flow chart for an exemplary method of operating an embodiment of the invention arranged in accordance with the principles of the invention.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the FIGURE, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the FIGURE are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of controlling access by an application to data or a service supported by a computing system, said method comprising:
   identifying, by said computing system, a request from said application for access to said data or said service supported by said computing system;
   determining, by said computing system, whether said access has been restricted to said data or said service, wherein said access to said data or said service is requesting-application specific; and, if so,
   indicating to said application, by said computing system, that said request for said access has been granted by said computing system; and
   automatically emulating, by said computing system, said data or said service when said data or said service is accessed by said application,
   wherein if said service being accessed is: a microphone, a camera, a video camera, or a GPS location service, a response to the request comprises: an audio file, an image, a movie, or location data, respectively; and
   wherein if said service being accessed is permission to perform calls, said response to the request comprises emulating a fake phone call with a non-responding number.

2. The method according to claim 1, wherein said automatically emulating comprises determining which data or service is being accessed by said application and creating said response to said application in dependence upon said data or said service being accessed.

3. The method according to claim 1, wherein said automatically emulating comprises determining which data or service is being accessed by said application and seeking an indication of a suitable response from a user before creating said response to said application in dependence upon said data or said service being accessed together with said indicated suitable response.

4. The method according to claim 3, wherein said creating comprises:
   assessing whether said user has indicated that at least one response associated with said data or said service being accessed is to remain accessible to said application, and, if so,
   creating said response based on said accessible response.

5. The method according to claim 3, wherein if said service being accessed is: the microphone, the camera, the video camera, the GPS location service, a contact list, or a local file system, said created response comprises: the audio file, the image, the movie, the location data, contact details, or an appropriate folder structure, respectively.

6. The method according to claim 3, wherein if said service being accessed is cellular Internet access, said created response comprises determining whether a free wireless network is accessible and routing a request for Internet access via said free wireless network.

7. The method according to claim 3, wherein if said service being accessed is Internet access, said created response comprises return of a cached webpage or return of an appropriate error webpage.

8. The method according to claim 1, further comprising seeking, at said computing system, an indication from a user regarding an appropriate response to an access request before emulating a response.

9. The method according to claim 1, wherein said determining, at said computing system, comprises seeking an indication of whether a user wishes to restrict access to said data or said service.

10. The method according to claim 1, wherein said determining, by said computing system, comprises assessing whether a default restriction of said access to said data or said service has been set.

11. The method according to claim 1, wherein said computing system comprises a mobile device that has an open source operating system.

12. The method according to claim 1, wherein if said service being accessed is local file-system access, said response to the request comprises a fake file-system service showing empty folders.

13. The method according to claim 1, wherein if said service being accessed is local file-system access, said response to the request comprises a filter which shows contents which are a subset of actual contents of a file system.

14. A non-transitory computer readable medium of a computing system having computer readable instructions encoded therein, said computer readable instructions adapted to be executed to implement steps comprising:
   identifying, by said computing system, a request from said application for access to said data or said service supported by said computing system;
   determining, by said computing system, whether said access has been restricted to said data or said service, wherein said access to said data or said service is requesting-application specific; and, if so, indicating to said application, by said computing system, that said request for said access has been granted by said computing system; and automatically emulating, by said computing system, said data or said service when said data or said service is accessed by said application, wherein if said service being accessed is: a microphone, a camera, a video camera, or a GPS location service, a response to the request comprises: an audio file, an image, a movie, or location data, respectively; and wherein if said service being accessed is permission to perform calls, said response to the request comprises emulating a fake phone call with a non-responding number.

15. A method, consisting of:

identifying, by a computing system, a request from an application for access to data or a service supported by said computing system;

determining, by said computing system, whether said access has been restricted to said data or said service, wherein said access to said data or said service is requesting-application specific; and, if so, indicating to said application, by said computing system, that said request for said access has been granted by said computing system; and automatically emulating, by said computing system, said data or said service when said data or said service is accessed by said application;

wherein if said service being accessed is permission to perform calls, said response to the request comprises emulating a fake phone call with a non-responding number.

* * * * *